(12) United States Patent
Norris et al.

(10) Patent No.: US 9,766,419 B2
(45) Date of Patent: Sep. 19, 2017

(54) FIBER OPTIC CABLE SUB-ASSEMBLIES AND METHODS OF ASSEMBLING

(71) Applicant: CORNING OPTICAL COMMUNICATIONS LLC, Hickory, NC (US)

(72) Inventors: Martin Eugene Norris, Lenoir, NC (US); Thomas Theuerkorn, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/573,720

(22) Filed: Dec. 17, 2014

(65) Prior Publication Data

US 2015/0104133 A1    Apr. 16, 2015

Related U.S. Application Data

(62) Division of application No. 13/734,206, filed on Jan. 4, 2013, now Pat. No. 8,942,528.

(60) Provisional application No. 61/585,089, filed on Jan. 10, 2012, provisional application No. 61/589,606, filed on Jan. 23, 2012.

(51) Int. Cl.
| G02B 6/44 | (2006.01) |
|---|---|
| G02B 6/42 | (2006.01) |
| G02B 6/38 | (2006.01) |

(52) U.S. Cl.
CPC ......... *G02B 6/4256* (2013.01); *G02B 6/3887* (2013.01); *G02B 6/424* (2013.01); *G02B 6/4429* (2013.01); *G02B 6/4477* (2013.01); *G02B 6/4214* (2013.01); *G02B 6/4284* (2013.01); *Y10T 29/49826* (2015.01); *Y10T 29/49947* (2015.01)

(58) Field of Classification Search
CPC ........................................................ G02B 6/44
USPC ............................................... 385/113, 77, 53
See application file for complete search history.

(56) References Cited

U.S. PATENT DOCUMENTS

| 4,595,839 A * | 6/1986 | Braun .................. | G02B 6/4202 |
|---|---|---|---|
| | | | 250/227.24 |
| 5,778,122 A * | 7/1998 | Giebel ................. | G02B 6/3825 |
| | | | 385/137 |
| 2011/0268390 A1* | 11/2011 | Yi ......................... | G02B 6/4201 |
| | | | 385/50 |
| 2014/0023327 A1* | 1/2014 | Smith .................. | G02B 6/3817 |
| | | | 385/86 |

\* cited by examiner

*Primary Examiner* — Kaveh C Kianni
(74) *Attorney, Agent, or Firm* — Michael E. Carroll, Jr.

(57) ABSTRACT

A fiber optic cable sub-assembly comprises a fiber optic cable including at least one optical fiber, a cable jacket that houses the optical fiber and at least one metal strength member. A collar is attached to an end portion of the metal strength member, wherein the optical fiber extends beyond an outer axial end of the collar. In another example a fiber optic cable assembly is fabricated from the fiber optic cable sub-assembly wherein a connector housing is attached to the collar, and an interface operably connects an end portion of the optical fiber to an active optical component within the connector housing. In further examples, methods of assembly for a fiber optic cable sub-assembly are provided along with using the sub-assembly for making a fiber optic cable assembly.

20 Claims, 7 Drawing Sheets

FIBER OPTIC CABLE SUB-ASSEMBLIES AND METHODS OF ASSEMBLING

RELATED APPLICATIONS

This application is a divisional of U.S. patent application Ser. No. 13/734,206 filed on Jan. 4, 2013, which claims the benefit of priority to U.S. Provisional Application No. 61/585,089 filed on Jan. 10, 2012 and U.S. Provisional Application Ser. No. 61/589,606, filed on Jan. 23, 2012, the contents of which are relied upon and incorporated herein by reference in their entirety.

BACKGROUND

Field

The present disclosure relates generally to fiber optic cable sub-assemblies and methods of assembling and, more particularly, to fiber optic cable sub-assemblies including a collar attached to an end portion of a metal strength member of a cable and methods of assembling a fiber optic cable sub-assembly with a collar.

Technical Background

Fiber-optic cables are known for their ability to transmit data at higher data rates than electrical cables. With the increasing demand for high-speed data transmission for consumer electronic devices (tablets and laptop computers, digital cameras, video cameras, or the like) optical fibers are starting to be used for data transmission in these applications.

To this end, fiber optic assemblies for consumer electronic devices need to be terminated in a robust manner that allows them to operably connect to the electronic devices over a large number of mating/unmating cycles. For example, many consumer electronic devices have electrical ports for establishing an electrical connection with an external device that support data rates of 5 Gb/s or more. To support these higher-speed applications, active optic cable (AOC) assemblies are emerging that allow the use of the optical fibers as the transmission medium between electrical connectors instead of copper wires. In these AOC assemblies the electrical signals at the first connector are converted to optical signals for transmission along the optical fibers and then converted from the optical signal back to electrical signals at the second connector and vice versa. In other words, the AOC assembly has electrical connectors on each end for the interface connection with the respective devices and one or more optical fibers in the cable for transmitting data between the electrical connectors.

When attaching fiber optic cables to connectors for creating the optical cable assembly, care must be taken to preserve excess optical fiber length in the cable to avoid axial load that may cause undesired deformation resulting in tension of the fiber and potential attenuation and/or physical harm to the cable assembly such as pulling the optical fibers from the ferrule. Conventional fiber optic cable configurations for telecommunication applications are known to employ various types of strength members such as aramid yarns, fiberglass yarns, glass-reinforced plastic rods or the like as the main strength members of the cable. One or more optical connectors may be attached to an end of the fiber optic cable to form an optical cable assembly (i.e., a fiber optic cable attached to an optical connector) and the strength member are secured to the optical connector for providing strain-relief. However, these conventional methods of strain-relieving optical connectors to fiber optic cables in telecommunication applications typically are not suitable for cable assemblies used with consumer electronic devices due to the large number of mating/unmating cycles and the given footprint of the electrical connector.

SUMMARY

In one example aspect, a fiber optic cable sub-assembly comprises a fiber optic cable including at least one optical fiber, a cable jacket that houses the optical fiber and at least one metal strength member. A collar is attached to an end portion of the metal strength member, wherein the optical fiber extends beyond an outer axial end of the collar.

In another example, aspect, a fiber optic cable assembly comprises a fiber optic cable including at least one optical fiber, a cable jacket that houses the optical fiber and at least one metal strength member. A first fiber optic sub-assembly includes a first collar attached to a first end portion of the metal strength member. A first end portion of the optical fiber extends beyond an outer axial end of the first collar, a first connector housing is attached to the first collar, and a first interface operably connects the first end portion of the optical fiber to a first active optical component within the first connector housing.

In yet another example aspect, a method of assembling a fiber optic cable sub-assembly comprises the step of providing a fiber optic cable with at least one optical fiber, a cable jacket that houses the optical fiber and at least one metal strength member. The method further includes the steps of providing a collar and attaching the collar to the metal strength member, wherein an end portion of the optical fiber extends through the collar to protrude from an outer axial end of the collar.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

The present disclosure will now be described more fully hereinafter with reference to the accompanying drawings in which example embodiments are shown. Whenever possible, the same reference numerals are used throughout the drawings to refer to the same or like parts. However, the concepts may be embodied in many different forms and should not be construed as limited to the embodiments set forth herein. These example embodiments are provided so that this disclosure will be both thorough and complete, and will fully convey the scope of the concepts to those skilled in the art.

Aspects of the disclosure provide a fiber optic cable sub-assembly with a fiber optic cable including at least one optical fiber, a cable jacket that houses the optical fiber and at least one metal strength member. The collar can be attached to an end portion of the metal strength member, wherein the optical fiber extends beyond an outer axial end of the collar. Such fiber optic cable sub-assemblies can be helpful to manufacture a fiber optic cable assembly with a connector housing that may be attached to the collar. In such examples, the collar can transmit tensile forces from the metal strength member to the connector housing, thereby isolating the optical fibers and interfacing components from forces that may otherwise be applied by the metal strength member.

Aspects of the disclosure may be used with a passive optical cable assembly or an active optical cable assembly. A passive optical cable assembly has connectors with an optical interface and may include electrical connections as desired. On the other hand, the active optical cable assembly converts an inputted electrical signal to an optical signal for transmission along the optical fibers and then converts the transmitted optical signal to an electrical signal at the output side. As such, the active optical cable assembly may include an active optical component such as integrated chips, photodiodes, VCSEL and/or other components at or near the connector for converting optical signals to electrical signals. The active components may be aligned with a total internal reflection (TIR) block, lead-frame, ferrule or other structure for aligning the optical signals. The TIR block, ferrule or the like receive and are attached to one or more optical fibers.

Figure 1:
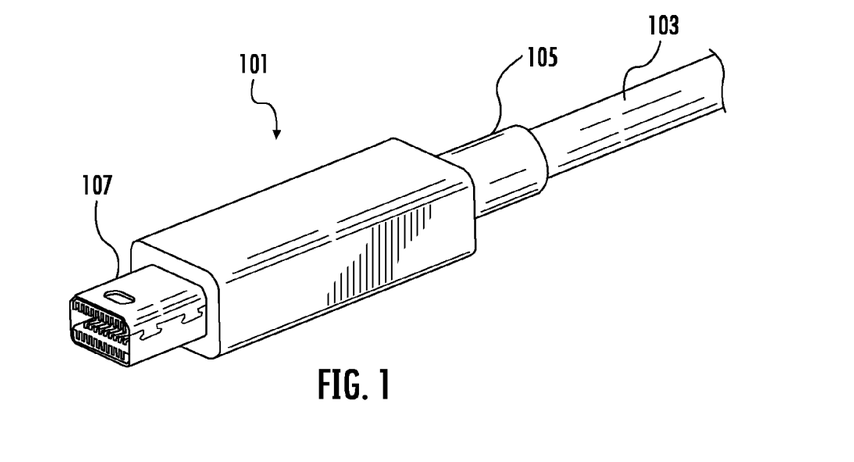
FIG. 1 is a perspective view of an example assembled optical cable assembly having a connector.
Figure 2:
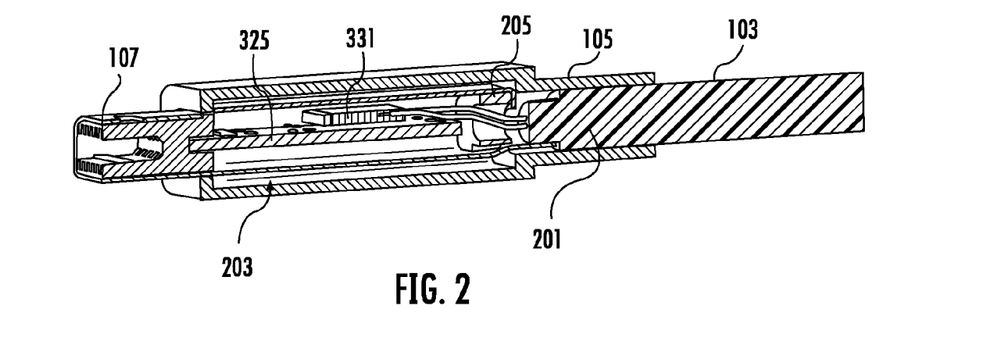
FIG. 2 is a cross-sectional view of one example optical cable assembly.
Figure 3:
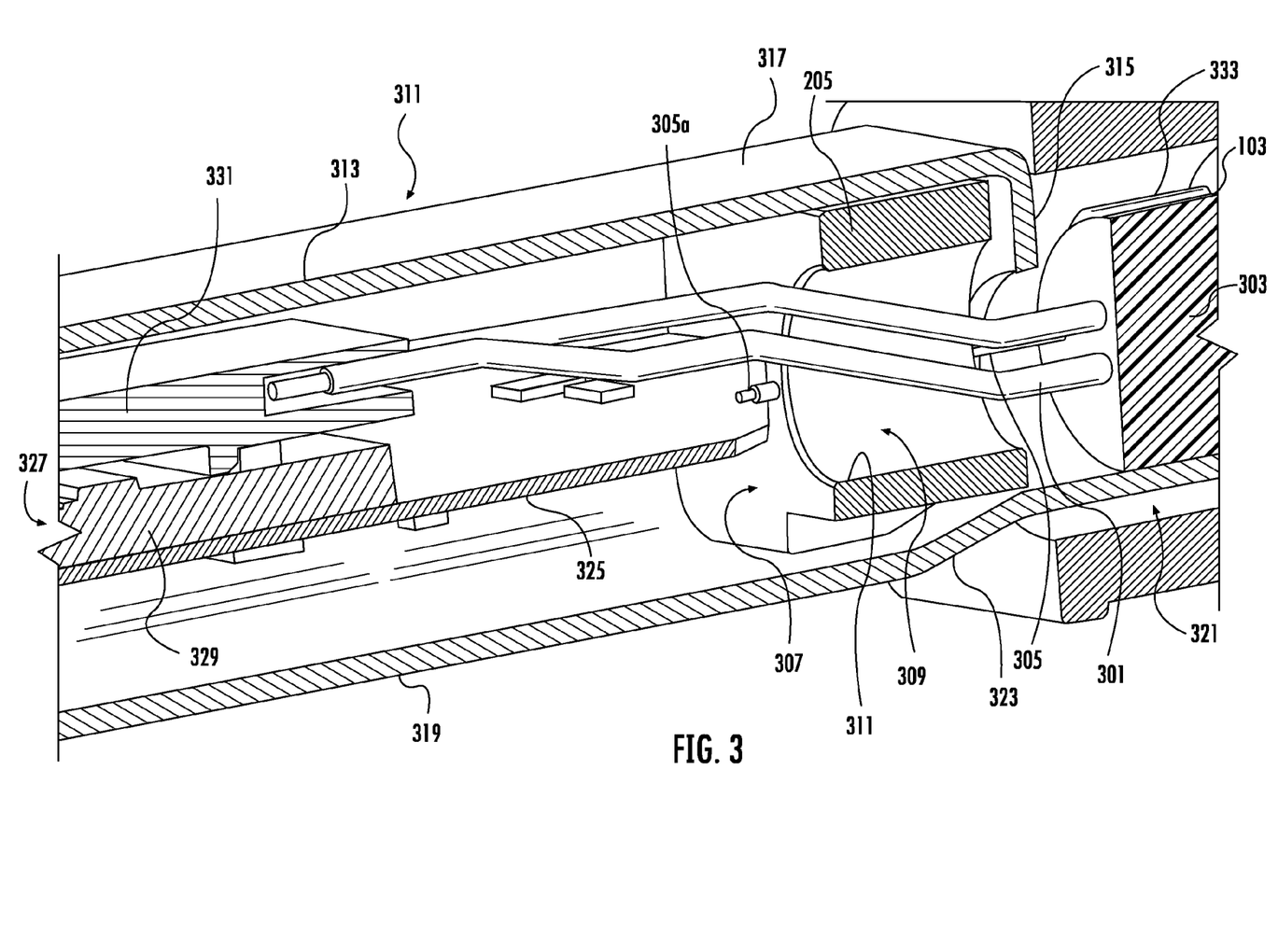
FIG. 3 is an enlarged view of portions of the optical cable assembly of FIG. 2.

FIG. 1 illustrates an explanatory example assembled fiber optical cable assembly 101 that comprises an active optical cable assembly although aspects of the disclosure may be used with passive optical cable assembly in further examples. Example components of the fiber optical cable assembly 101 and methods of assembling the fiber optical cable assembly 101 can be understood with reference to FIGS. 2 and 3. As shown in FIGS. 1-3 the fiber optical cable assembly 101 includes a fiber optic cable 103. As shown in FIG. 3, the fiber optic cable 103 includes at least one optical fiber 301, such as the illustrated plurality of optical fibers. The at least one optical fiber 301 is configured to transmit light across a fiber length between opposed ends of the fiber optical cable assembly 101.

Each optical fiber 301 may be individually protected by a protective coating applied to individual strands of optical fiber or bundles of optical fibers. In addition or alternatively, the fiber optic cable can include a cable jacket 303 that houses the optical fiber. The cable jacket 303 can further help protect the optical fibers housed within the cable jacket 303 from external environmental conditions. For example, the cable jacket 303 may comprise rubber, plastic or other materials resistant to moisture, environmental forces acting on the optical cable assembly or other environmental conditions.

The cable jacket 303 may include an internal passage freely receiving the optical fibers 301 therethrough although the optical fibers may be encapsulated within the cable jacket in further examples. Providing an internal passage for freely receiving the optical fibers 301 can allow the cable jacket 303 to act as a conduit to allow free passage of optical fibers through the cable jacket 303. As such, in some examples, the cable jacket 303 may be provided with a single or a plurality of optical fibers depending on the particular application.

The cable jacket 303 can also help prevent undesired bending of the optical fibers 301 and/or undesired axial loading of the optical fibers 301. Preventing undesired bending can help the optical fibers 301 maintain a minimum bend radius and can help reduce stress within the optical fiber and/or help maintain optimum transmission of light through the optical fibers 301. Moreover, placing the fiber optical cable assembly 101 under undue tension or compression can be absorbed by the cable jacket 303 without being transmitted to the relatively delicate optical fibers 301 housed within the cable jacket 303. The structural configuration of the cable jacket 303 may allow the cable jacket to resist axial loading and/or undesired bending. For instance, the outer shape of the cable jacket may be designed to resist bending moments.

In further examples, cable jacket may be provided with at least one metal strength member 305, such as the illustrated elongated metal strength member, extending along a length, such as substantially the entire length of the cable jacket 303. The metal strength member may comprise a substantially continuous member extending from a first end of the cable to the second end of the cable. Moreover, forming the strength members from metal can still further help maximize the strength of the cable jacket; however, the concepts disclosed herein may be used with non-conductive strength members as appropriate. Metal can comprise steel (e.g., stainless steel), copper, stranded metal wire, stainless steel stranded wire or other types of metal.

As shown in FIGS. 1-3 the fiber optical cable assembly 101 can further include an optional cable boot 105 that may be provided to help guide and attach an end portion 201 of the fiber optic cable 103 to a connector housing 203.

As shown in FIGS. 2 and 3, the optical cable assembly further includes a collar 205 that may be attached, such as rigidly attached, to an end portion 305a of the at least one metal strength member 305. In some examples, the collars throughout the disclosure (e.g., collars 205, etc.) may comprise a conductive material such as metal (e.g., stainless steel), conductive resin, or other conductive material. Fabricating the collar from a conductive material, such as metal, can increase the strength of the overall fiber optic cable assembly, but the use of non-conductive materials are also possible with the concepts disclosed herein. For example, metal collars may be provided that can be quickly swaged or crimped to the metal strength members to provide a particularly solid and strong attachment between the collar and the metal strength members. Fabricating the collars from conductive material may be particularly beneficial for relatively short cable lengths where electrical current generation within the metal strength members 305 is not typically generated by interaction with external magnetic fields. Example short cable lengths can be from about 1 meter to about 3 meters although relatively short cable lengths may be less than 1 meter or greater than 3 meters in further examples depending on the operation environment. With relatively long cable lengths, there is an increased chance of current developing within the elongated metal strength member by action of "ground loop" where a current may be generated by interaction with external magnetic fields or other environmental factors (e.g., electrical field, electrical devices, wireless networks, etc.). Relatively long cable lengths that may encounter "ground loop" may have lengths of greater than 3 meters although less than 3 meters may also be provided in further examples depending on the operation environment. In such examples, there may be a desire to fabricate the collar (e.g., collar 205, etc.) from a dielectric material such as resin, plastic, or other nonconductive material. Providing the collar with dielectric material can help insulate the metal strength members from the connector housing to inhibit, such as prevent, electric current from passing along the metal strength members and onward through the connector housing.

Rigid attachment of the example collars of the disclosure (e.g., collar 205, etc.) to the at least one metal strength member 305 can be achieved in a wide range of ways depending on the material type and application requirements. For example, rigid attachment can be achieved with integral attachment, for example, by welding (e.g., laser welding) the ends of the metal strength member(s) to the collar to achieve a welded connection. In further examples, attachment (e.g., rigid attachment) can be achieved by swaging to obtain a swaged connection, crimping to achieve a crimped connection, clamping to achieve a clamped connection, tightening set screws to achieve a set-screw connection, and/or applying adhesive to achieve an adhesive connection. In further examples, example collars of the disclosure may optionally comprise multiple pieces that are screwed, pinned or otherwise connected together to achieve attachment (e.g., rigid attachment) of the collar to the end portion 305a of the metal strength member 305.

As shown in FIG. 3, the collar 205 may be attached to the end portion 305a of the metal strength member 305, wherein the optical fiber 301 extends beyond an outer axial end 307 of the collar 205. Moreover, as shown in FIG. 3, the collar 205 may include an inner passage 309 to the permit the optical fiber 301 to pass through the collar 205 to protrude from the outer axial end 307 of the collar. The inner passage 309 can be formed from a ring structure, such as the illustrated ring surface. The ring structure may extend at least partially about or completely about the optical fiber 301. For example, as shown, the ring structure passes entirely around the optical fiber 301 to completely circumscribe an intermediate portion of the optical fiber 301. In further examples, the ring structure may only extend partially about the optical fiber 301. For example, the ring structure can comprise a C-shaped or U-shaped structure that has a lateral opening to allow lateral insertion of the intermediate portion of the optical fiber 301 into the inner passage.

The embodiment of FIGS. 2 and 3 illustrate a fiber optic cable sub-assembly comprising the fiber optic cable 103 including the at least one optical fiber 301, the cable jacket 303 that houses the optical fiber 301 and at least one metal strength member 305. The cross section of FIG. 3 illustrates one of two metal strength members 305 although a single metal strength member or more than two strength metal strength members may be provided in further examples. The fiber optic cable sub-assembly further includes the collar 205 attached to the end portion 305a of the metal strength member 305, wherein the optical fiber 301 extends beyond the outer axial end 307 of the collar 205.

Moreover, the embodiment of FIGS. 2 and 3 illustrate portions of a fiber optic cable assembly 101 that includes the fiber optic cable sub-assembly. Indeed, the fiber optic cable assembly 101 includes a connector housing 311 attached to the collar 205. In this example, the collar 205 may be attached to the housing by being trapped in place relative to the connector housing 311. Indeed, as shown, the upper housing portion 313 can include a stop tab 315 at the rear extending at an angle relative to an elongated body portion 317 of the upper housing portion 313. Likewise, the connector housing 311 further includes a lower housing portion 319 with a rear portion 321 may include a tapered part 323. The tapered part 323 and the stop tab 315 can cooperate to arrest rearward movement of the collar 205 with respect to the connector housing 311. As such, the housing can provide a backstop for the collar to transfer tensile forces from the strength member to the connector housing. At the same time, the outer axial end 307 can abut and end portion of the circuit board 325 to arrest forward movement of the collar 205 or have structure for securing a portion of the circuit board. In addition, the rear portion 321 may include a jacket support structure 333 that may cradle an end of the cable jacket 303 to help support the end of the cable relative to the connector housing 311. In one example, the jacket support structure 333 can comprise a crimping or other clamping structure configured to clamp the end of the cable jacket 303. Still further the outer peripheral portions of the collar 205 are designed to closely follow the interior surface profile of the connector housing 311 to help prevent rotational and/or radial movements of the collar 205 relative to the connector housing 311.

As further illustrated in FIG. 3, the fiber optic cable assembly 101 further includes an interface 327 connecting the optical fiber 301 to an active optical component 329 within the connector housing 311. The active optical component 329 can comprise integrated chips, photodiodes, VCSEL and/or other components at or near the connector for converting optical signals to electrical signals.

The interface can comprise a total internal reflection (TIR) block, ferrule or other structure for aligning the optical fibers. In the illustrated example, the interface 327 can further include a total internal reflection block (TIR) 331 that may be operably attached to the optical fiber 301 (as shown in FIG. 3). As such, the interface 327 may operably connect the optical fiber 301 to the active optical component 329 on the circuit board 325 within the connector housing 311. For instance, as shown in FIG. 3, the TIR block 331 can then be aligned and attached with respect to the active optical component 329. The active optical component 329 is shown aligned with the TIR block 331 in FIG. 3. As such, the optical fibers 301 are placed in optical communication with the active optical component 329 to be housed within the connector housing 311.

In one example, the active optical component 329 may be incorporated on the circuit board 325 with other components. In one example, the components of the circuit board 325 may be configured to process optical signals from the optical fibers into electrical signals for providing to the plug 107 shown in FIGS. 1 and 2. In further examples, the components of the circuit board 325 may be configured to process electrical signals into optical signals for transmitting down the fiber optic cable 103 by way of the optical fiber 301.

Figures 4, 5:
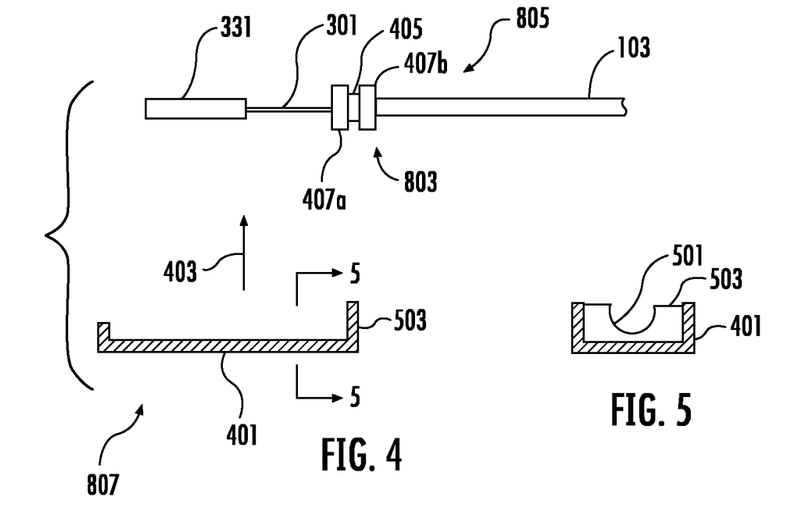
FIG. 4 illustrates a schematic step of attaching a collar of a fiber optic cable sub-assembly with a portion of a housing.
FIG. 5 is a cross-sectional view of the portion of the housing along line 5-5 of FIG. 4.
Figure 8:
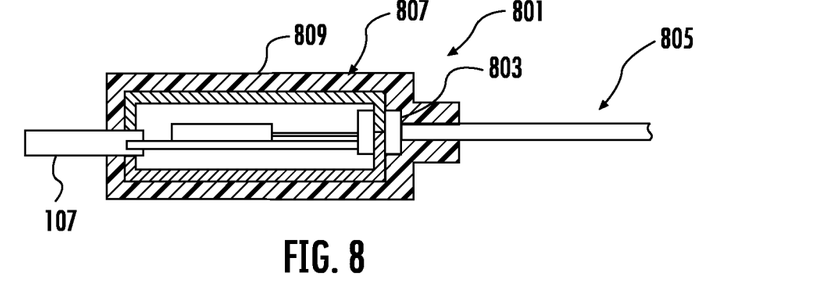
FIG. 8 illustrates a schematic cross-sectional view of the optical cable assembly produced by the steps of FIGS. 4 and 6 with an outer housing mounted over the housing portions.

As discussed above, FIGS. 2 and 3 illustrate attachment of the collar to the connector housing by way of trapping the collar with respect to the connector housing. FIG. 8 illustrates another example fiber optic cable assembly 801 wherein a collar 803 of a fiber optic cable sub-assembly 805 is attached to the connector housing 807 by an interlocked attachment of the collar 803 to the connector housing 807. FIGS. 4-7 illustrate steps and structures of the collar and connector housing to achieve the interlocked attachment. FIG. 4 illustrates the fiber optic cable 103 similar or identical to the fiber optic cable 103 discussed with respect to FIGS. 1 and 3 above. Moreover, as discussed above, the fiber optic cable sub-assembly 805 can further include a TIR block 331 for interfacing the ends of the optical fibers 301 of the fiber optic cable 103.

Figures 6, 7:
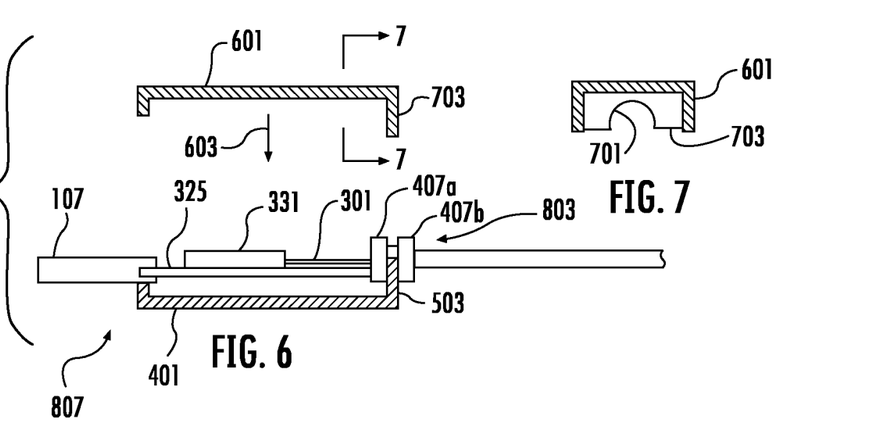
FIG. 6 illustrates a further schematic step of interlocking the collar of the fiber optic cable sub-assembly of FIG. 4 with another portion of the housing.
FIG. 7 is a cross-sectional view of the portion of the housing along line 7-7 of FIG. 6.

As illustrated in FIG. 4, the collar 803 can include an intermediate portion 405 defined between axial spaced shoulders 407a, 407b. As further shown in FIG. 4, the connector housing 807 may include a first housing portion 401 with an arcuate slot 501 in an end wall 503 shown in FIG. 5. The first housing portion 401 is then moved in direction 403 such that the intermediate portion 405 is received within the arcuate slot 501 of the end wall 503. As shown in FIG. 6, once received, portions of the end wall 503 about the arcuate slot 501 are sandwiched between the axial spaced shoulders 407a, 407b such that the collar 803 is interlocked with respect to the first housing portion 401.

Likewise, as shown in FIG. 6, the connector housing 807 may include a second housing portion 601 with an arcuate slot 701 in an end wall 703 shown in FIG. 7. The second housing portion 601 is then moved in direction 603 such that the intermediate portion 405 is received within the arcuate slot 701 of the end wall 703. As shown in FIG. 8, once received, portions of the end wall 703 about the arcuate slot 701 are sandwiched between the axial spaced shoulders 407a, 407b such that the collar 803 is interlocked with respect to the second housing portion 401. An outer protective housing portion 809 can then be added to finalize the assembly of the fiber optic cable assembly 101.

Figure 9:
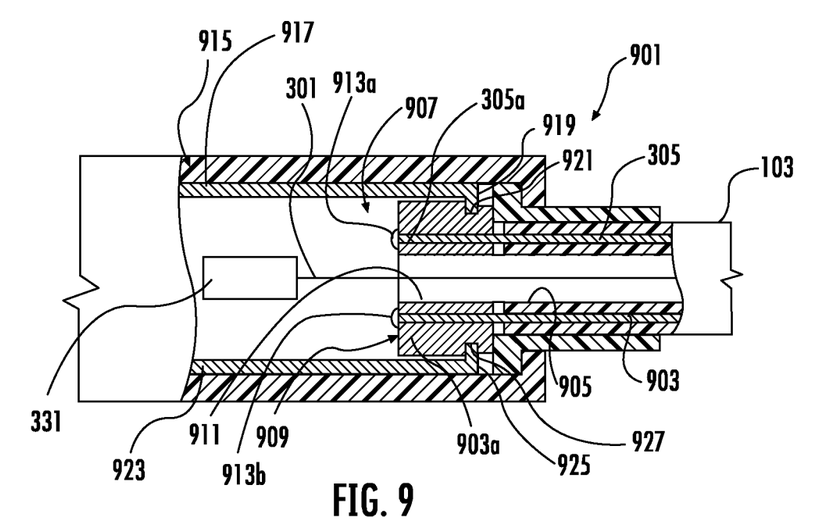
FIG. 9 is a partial sectional view of another optical cable assembly.

FIG. 9 is a partial sectional view of another fiber optic cable assembly 901 including the fiber optic cable 103 similar or identical to the fiber optic cable 103 discussed with respect to FIGS. 1 and 3 above. As with any of the examples of the present disclosure, the fiber optic cable 103 can include a single or a plurality of metal strength members or the like. For example, FIG. 9 illustrates a second metal strength member 903 in addition to the first metal strength member 305. Although two metal strength members 305, 903 are illustrated, in further examples, one or more than two metal strength members may be provided. Furthermore, as shown, the first and second metal strength members 305, 903 may optionally be symmetrically positioned at opposite sides of an internal passage 905 to help evenly fortify the internal passage containing the optical fibers 301. As still further illustrated in FIG. 9, the metal strength members 305, 903 may be optionally at least partially encapsulated within cable jacket 303 although the metal strength members may extend exterior to the cable jacket or within the internal passage 905 in further examples. At least partially encapsulating the metal strength members 305, 903 within the cable jacket 303 can help protect the metal strength members from corrosion and can also further strengthen the cable member due to the composite nature of the metal strength member and cable jacket.

Any of the example fiber optic cables may provide a cable jacket with an optional internal passage. For instance, as shown in FIG. 9, an internal passage 905 can facilitate loose reception of the optical fibers 301 along the length of the cable jacket. In such examples, different numbers of optical fibers 301 may be provided depending on the particular application without the need for a different cable jacket. Moreover, one or more optical fibers 301 may be simply threaded through the internal passage 905, thereby facilitating assembly of the fiber optic cable 103. Alternatively, any of the example fiber optic cables may include a cable jacket that at least partially encapsulates the optical fibers. For instance, as shown in FIGS. 2 and 3, the optical fibers 301 can be encapsulated within the cable jacket 303. Encapsulating the optical fibers 301 may be desirable in some applications to help protect the optical fibers from undesirable environmental conditions.

The fiber optic cable assembly 901 further includes a collar 907 attached to respective end portions 305a, 903a of the corresponding metal strength members 305, 903, wherein the optical fiber 301 extends beyond an outer axial end 909 of the collar 907. The collar 907 can be attached to the end portions 305a, 903a by welding as indicated by weld beads 913a, 913b although various alternative attachment methods may be carried out in various examples. More particularly, the collar 907 can include an axial bore 911 aligned with the internal passage 905 of the fiber optic cable 103. As such, the optical fiber 301 may extend through the collar 907 to protrude from the outer axial end 909 of the collar 907.

The fiber optic cable assembly 901 further includes a connector housing 915 attached to the collar 907. For example, the connector housing 915 can include a first portion 917 including an engagement tongue 919 configured to be received within a corresponding engagement groove 921 of the collar 907. Likewise, the connector housing can include a second portion 923 including an engagement tongue 925 configured to be received within a corresponding engagement groove 927 of the collar 907.

Figure 10:
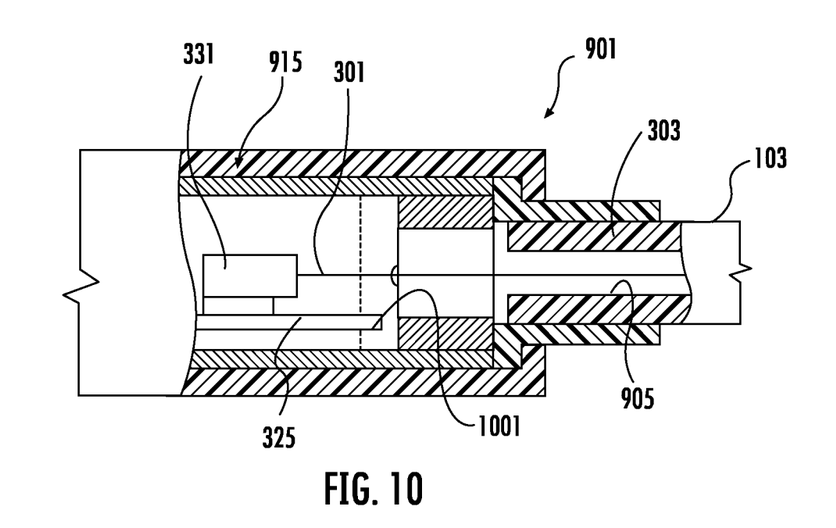
FIG. 10 is another partial sectional view of the optical cable assembly of FIG. 9.

As shown in FIG. 10, the collar 907 may optionally include a support slot 1001 configured to support an end portion of the circuit board 325. As further illustrated, a TIR block 331 may be provided for interfacing the ends of the optical fibers 301 of the fiber optic cable 103 in a manner that may be similar or identical to the previous described examples.

Figure 11:
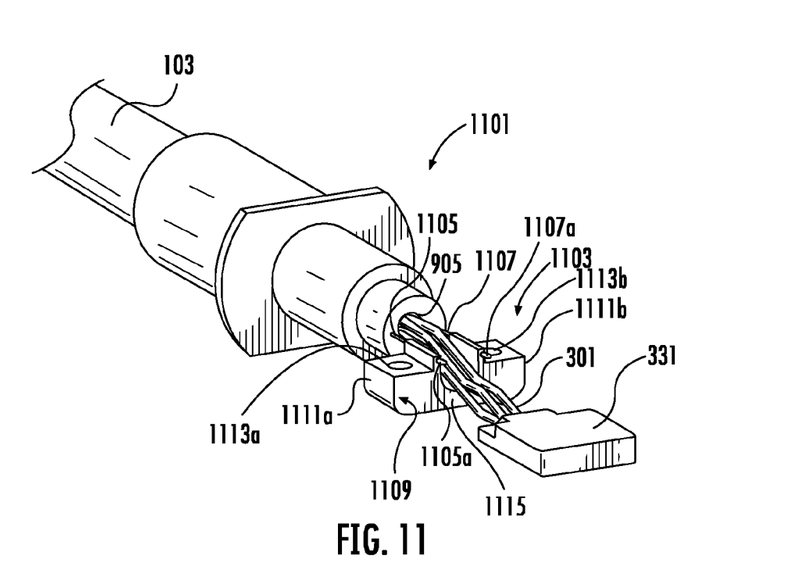
FIG. 11 is a perspective view of another fiber optic cable sub-assembly.

FIG. 11 illustrates yet another example of a fiber optic cable sub-assembly 1101 comprising a fiber optic cable 103 similar or identical to the fiber optic cable 103 discussed with respect to FIGS. 1 and 3 above. The fiber optic cable sub-assembly 1101 further includes a collar 1103 attached to end portions 1105a, 1107a of metal strength members 1105, 1107, wherein the optical fiber 301 extends beyond an outer axial end 1109 of the collar 1103. The collar 1103 can include at least one mounting tab such as the pair of mounting tabs 1111a, 1111b. The mounting tabs can include a mounting structure such as pins or bores to facilitate assembly. For instance, as shown, each mounting tab 1111a, 1111b can include a corresponding bore 1113a, 1113b configured to receive a mounting pin as discussed more fully below. As further illustrated, the mounting tabs 1111a, 1111b can be laterally spaced apart with a partial ring structure 1115 positioned laterally between the spaced apart mounting tabs 1111a, 1111b. The optical fiber 301 can pass through a passage defined by the partial ring structure 1115. For example, as shown the ring structure may be designed to only extend partially about the optical fiber 301 although further examples may provide the ring structure entirely extending about the optical fiber 301. In the illustrated example, the partial ring structure 1115 can comprise a U-shaped ring structure defining that partially extends about the optical fiber 301. In such examples, the optical fiber 301 may be passed within the passage of the ring structure 1115 radially without the need to axially thread the optical fiber as may be required with example ring structures that extend entirely around the optical fiber.

Figure 12:
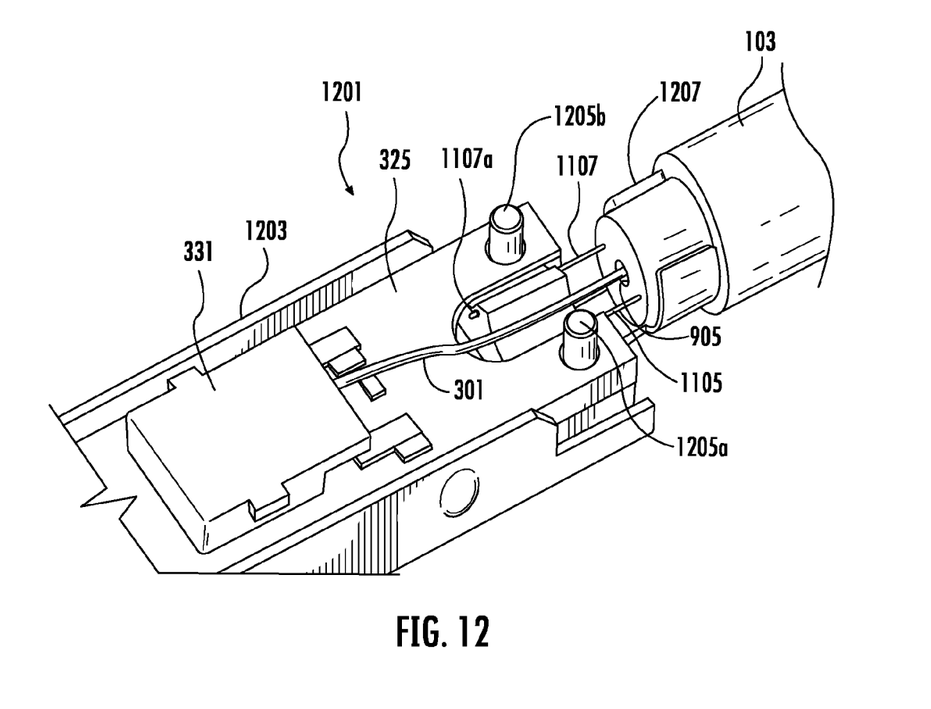
FIG. 12 is a perspective view of an optical cable apparatus being assembled with the fiber optic cable sub-assembly of FIG. 11.

FIG. 12 illustrates portions of a fiber optic cable assembly 1201 including the fiber optic cable sub-assembly 1101 of FIG. 11, wherein the fiber optic cable assembly 1201 further includes a connector housing 1203 attached to the collar 1103. As shown, the fiber optic cable assembly 1201 can include pins 1205a, 1205b that may be integral to the housing 1203 or separately attached to the housing 1203. The pins 1205a, 1205b may be received within a respective one of the bores 1113a, 1113b to attach the connector housing 1203 to the collar 1103. As shown, the pins 1205a, 1205b may also optionally extend through corresponding apertures in the circuit board 325 to facilitate placement and support of the circuit board 325 within the housing 1203. Still further, the collar may be attached directly to the circuit board in further examples, wherein the collar is attached to the housing indirectly by way of the circuit board.

As further illustrated the connector housing 1203 can also include a rear portion 1207 that may cradle or be crimped to an end of the fiber optic cable 103 to help support the end portion relative to the connector housing 1203. As further illustrated, a TIR block 331 may be provided for interfacing the ends of the optical fibers 301 of the fiber optic cable 103 in a manner that may be similar or identical to the previous described examples.

Figure 13:
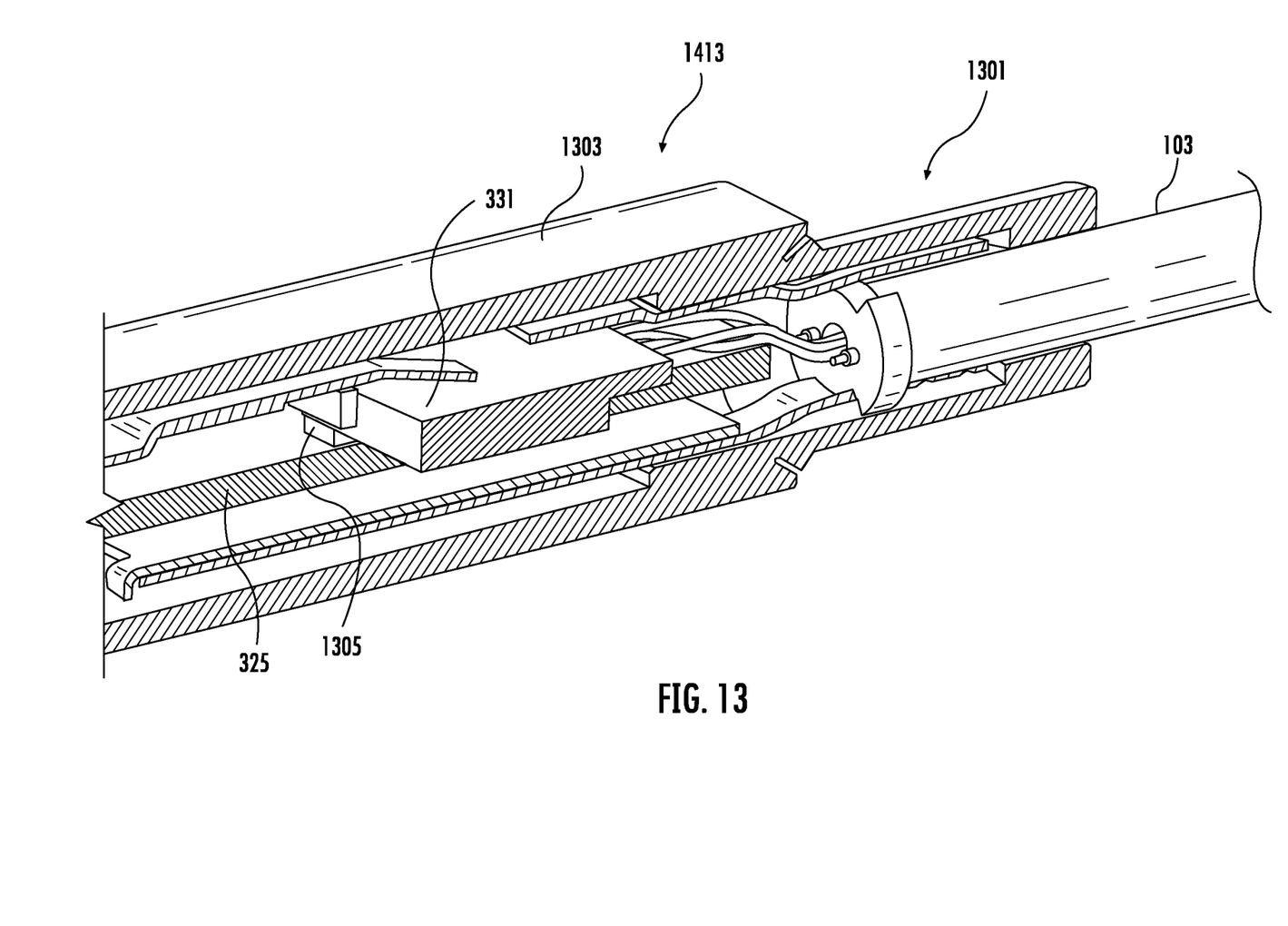
FIG. 13 is a cross-sectional perspective view of another optical cable assembly.
Figure 14:
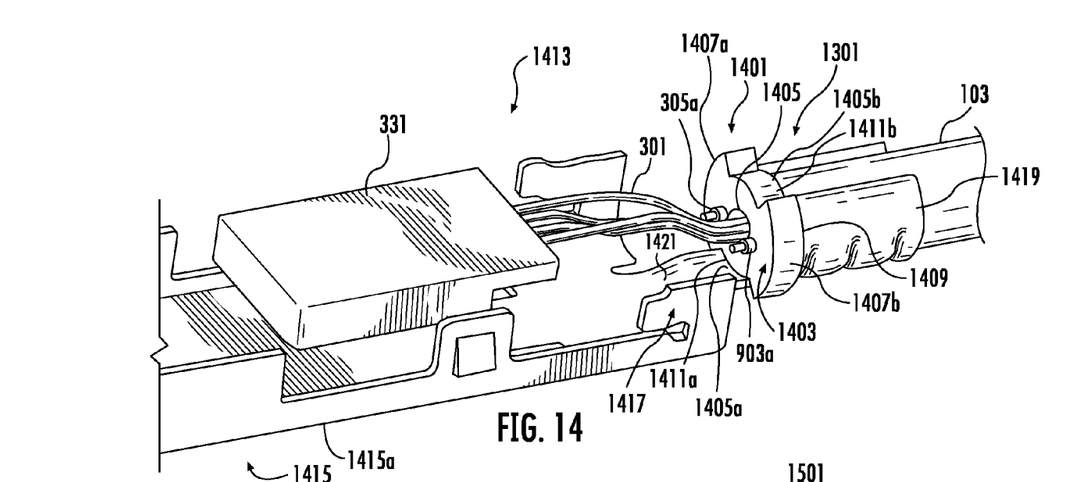
FIG. 14 illustrates a step of assembling the optical cable assembly of FIG. 13.
Figure 15:
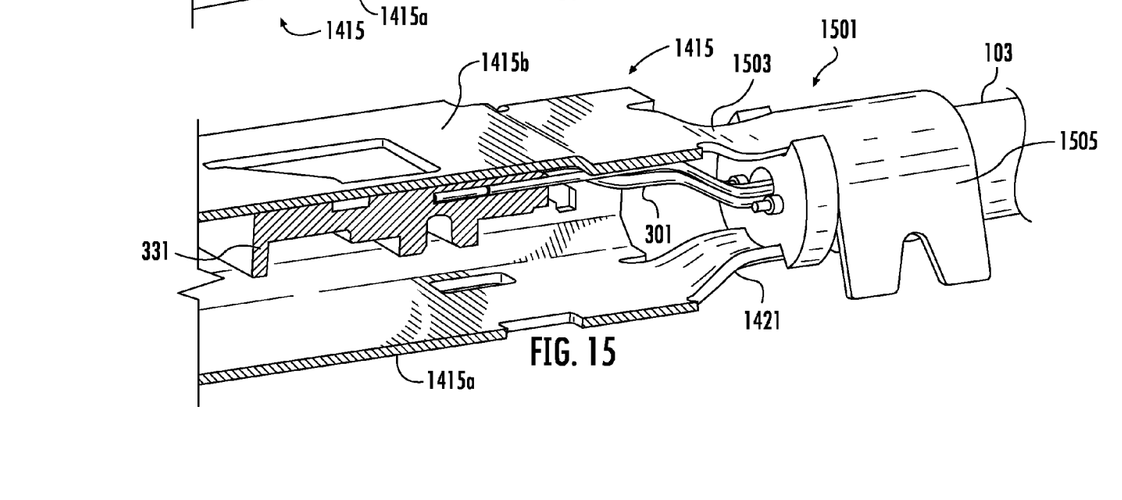
FIG. 15 illustrates a further step of assembling the optical cable assembly of FIG. 13.

FIGS. 13-15 illustrate yet another fiber optic cable sub-assembly 1301 including a fiber optic cable 103 similar or identical to the fiber optic cable 103 discussed with respect to FIGS. 1 and 3 above. As shown in FIG. 14, the fiber optic cable sub-assembly 1301 further includes a collar 1401 attached to end portions 305a, 903a of the metal strength members, wherein the optical fiber 301 extends beyond an outer axial end 1403 of the collar 1401. As shown, the collar 1401 can include an axial bore 1405 to permit the optical fiber 301 to extend through the collar 140a and protrude from the outer axial end 1403 of the collar 1401.

As shown in FIG. 14, the collar 1401 defines at least one axial groove 1405a, 1405b extending at a periphery of the collar 1401 between the outer axial end 1403 of the collar and an inner axial end 1409 of the collar. As shown, in further examples, the collar 1401 can include an arcuate portion 1411a, 1411b at least partially defining the axial groove 1405a, 1405b although other structural shapes may be provided in further examples. In the illustrated example, the collar 1401 includes a pair of laterally spaced ears 1407a, 1407b that at least partially define lateral portions of the axial groove 1405a, 1405b. For instance, as shown, the collar 1401 can include a first arcuate portion 1411a and a second arcuate portion 1411b that are each positioned between a pair of laterally spaced ears 1407a, 1407b to define a first axial groove 1405a and a second axial groove 1405b. Each of the axial grooves 1405a, 1405b extends at a periphery of the collar 1401 between the outer axial end 1403 of the collar and an inner axial end 1409 of the collar.

FIG. 14 further illustrates portions of a fiber optic cable assembly 1413 including the fiber optic cable sub-assembly 1301 wherein a connector housing 1415 is attached to the collar 1401. The connector housing 1415 includes first housing member 1415a with a first rear portion 1417 that engages an end portion of the fiber optic cable 103. For example, as shown, the rear portion 1417 can include a crimp band 1419 that may optionally crimp the end portion of the fiber optic cable 103 to help support the cable and attach the cable to the connector housing. In further examples, the first rear portion 1417 provides a backstop for the collar 1401 to transfer tensile forces from the strength member to the connector housing 1415. For example, as shown, the crimp band 1419 can engage the inner axial end 1409 of the collar 1401 such that the first rear portion 1417 can act as a backstop for the collar 1401. As further shown in FIG. 14, the first rear portion 1417 can include a first neck 1421 that may extend through the first axial groove 1405a and engage the first arcuate portion 1411a.

As illustrated in FIG. 15, the connector housing 1415 may optionally include a second housing member 1415b that can include a second rear portion 1501 with a second neck 1503 that may extend through the second axial groove 1405b and engage the second arcuate portion 1411b. The second rear portion can also provide a backstop for the collar 1401 to transfer tensile forces from the strength member to the connector housing 1415. For example, as shown, a cradle 1505 can engage the inner axial end 1409 of the collar 1401 such that the second rear portion 1501 also acts as a backstop for the collar 1401. As shown, the cradle 1505 is not yet crimped against the end of the fiber optic cable 103. The cradle 1505 is crimped for providing further secure attachment of the housing to the cable.

In the illustrated embodiment the first neck 1421 and the second neck 1503 can each include an arcuate shape configured to match the corresponding shape of the first arcuate portion 1411a and the second arcuate portion 1411b to allow the first and second neck to nest within the axial grooves 1405a, 1405b with lateral edges engaging corresponding ones of the pair of laterally spaced ears 1407a, 1407b. As such, a secure and sturdy connection may be achieved between the collar 1401 and the connector housing 1415.

As further illustrated in FIGS. 13-15, a TIR block 331 may be provided for interfacing the ends of the optical fibers 301 of the fiber optic cable 103 in a manner that may be similar or identical to the previous described examples. Moreover, as shown in FIG. 13, an outer housing portion 1303 may be provided to finish the fiber optic cable assembly 1413 and help protect the internal components of the assembly.

Each example illustrated in the drawings shows the fiber optic cable assembly including a single fiber optic sub-assembly associated with one end of the fiber optic cable. In further examples, the fiber optic cable assembly can include a second fiber optic sub-assembly including a second collar attached to a second end portion of the metal strength member. In such examples, the second end portion of the optical fiber can likewise extend through the second collar to protrude from an outer axial end of the second collar. Similar or identical connector housings may also be provided. As such, a second connector housing can be attached to the second collar, and a second interface can operably connect the second end portion of the optical fiber to a second active optical component within the second connector housing.

Methods of assembly the fiber optic cable sub-assembly shown in FIGS. 14 and 15 will now be described with the understanding that similar methods may be carried out to assemble any of the example sub-assemblies disclosed herein. As shown, the method can include the step of providing the fiber optic cable 103 with the at least one optical fiber 301. The fiber optic cable 103 can include a cable jacket 303 that houses the optical fiber 301 and at least one metal strength member 305, 903. The method can further provide the collar 1401 and attach the collar to the metal strength member by any one of a variety of procedures (e.g., welding, crimping, gluing, etc). Once attached, the end portion of the optical fiber 301 extends through the collar 1401 to protrude from the outer axial end 1403 of the collar 1401.

In further examples, method can be provided for assembling a fiber optic cable assembly 1413 including the method of assembling the fiber optic cable sub-assembly 1301. Next, the method can include the step of attaching the collar 1401 to the connector housing 1415 and then interfacing the end portion of the optical fiber (e.g., by the TIR block 331 with an active optical component 1305 of the circuit board 325 to be housed within the connector housing 1415.

The collars of the present disclosure can provide a particularly strong attachment with the metal strength members of a fiber optic cable. For instance, collars of the examples of the present disclosure can help preserve excess fiber length in the cable without undesired tensile forces being produced within the optical fiber that may result in pulling of fibers from fiber connections and interfaces or otherwise damaging the fiber.

Furthermore, collars of the present disclosure can also provide a mechanical reference for further assembly. For instance, accurate predetermined excess fiber lengths extending beyond the collar can be easily and repeatedly achieved to allow sufficient optical fiber length to ensure proper alignment and interfacing with the active optical components within the connection housing. The fiber optic sub-assembly can be produced that provides a mechanical reference (e.g., a datum) for further assembly of the fiber optic assembly. By using the collar for both the assembly process and the mechanical attachment of the cable in the final fiber optic assembly, it is possible to reduce the associated tolerance stack and essentially the length variation between the cable and the TIR, which terminates the optical fibers.

Collars of the disclosure can be used to position and attach the fiber optic sub-assembly to the connector housing to transfer the load from the metal strength members to the housing without introducing tensile stress to the delicate optical fibers of the assembly.

The collar designs herein may have various features such as a one-piece design or a multi-piece design. The collar can have a structure to permit attaching of the strength members and a passageway for the optical fibers. In one example, the collar may be formed from two halves that are clamped, pined, or screwed together for securing one or more metal strength members therein. In further examples, the collar can comprise a single piece with bores therein for inserting the metal strength members and then suing a suitable method of attaching such as welding (e.g., laser welding), adhesives, set-screws, swaging, crimping, clamping or the like.

It will be apparent to those skilled in the art that various modifications and variations can be made without departing from the spirit and scope of the disclosure. Thus, it is intended that the disclosure cover the modifications and variations provided they come within the scope of the appended claims and their equivalents.

What is claimed is:

1. A fiber optic cable sub-assembly comprising:
    a fiber optic cable including at least one optical fiber, a cable jacket that houses the optical fiber and at least one metal strength member;
    a collar attached to an end portion of the metal strength member, the collar comprising an inner passage and at least one bore, wherein:
        the at least one optical fiber is disposed within the inner passage and extends beyond an outer axial end of the collar;
        the at least one metal strength member is disposed within the at least one bore;
        the collar includes a first arcuate portion and a second arcuate portion that are each positioned between a pair of laterally spaced ears to define a first axial groove and a second axial groove; and
        the axial grooves each extend at a periphery of the collar between the outer axial end of the collar and an inner axial end of the collar; and
    a connector housing attached to the collar, wherein the connector housing provides a backstop for the collar to transfer tensile forces from the at least one metal strength member to the connector housing.

2. The fiber optic cable sub-assembly of claim 1, wherein the optical fiber extends through the collar to protrude from the outer axial end of the collar.

3. The fiber optic cable sub-assembly of claim 1, wherein the collar comprises a material selected from the group consisting of a dielectric material, a conductive material and a composite material.

4. The fiber optic cable sub-assembly of claim 1, the collar further comprising a passage, wherein the optical fiber passes through the passage.

5. The fiber optic cable sub-assembly of claim 4, wherein the passage is defined by a structure extends at least partially about the optical fiber.

6. The fiber optic cable sub-assembly of claim 1, wherein the collar is attached to the end portion of the at least one metal strength member by a connection selected from the group consisting of a swaged connection, a crimped connection, a clamped connection, set-screw connection, an adhesive connection, a welded connection, and a multi-piece collar connection.

7. A fiber optic cable assembly including the fiber optic cable sub-assembly of claim 1, wherein the collar is attached to the end portion of the at least one metal strength member by a crimped connection.

8. The fiber optic cable assembly of claim 7, further comprising an interface operably connecting the optical fiber to an active optical component within the connector housing.

9. The fiber optic cable assembly of claim 8, wherein the interface comprises a total internal reflection block operably attached to the optical fiber.

10. The fiber optic cable assembly of claim 8, wherein the interface operably connects the optical fiber to the active optical component on a circuit board within the connector housing.

11. The fiber optic cable assembly of claim 7, wherein the connector housing includes a first rear portion engaging an end portion of the fiber optic cable.

12. The fiber optic cable assembly of claim 1, wherein:
    the at least one bore comprises a first bore and a second bore;
    the first bore and the second bore are disposed on opposite sides of the inner passage;
    the at least one metal strength member comprises a first metal strength member and a second metal strength member; and the first metal strength member is disposed within the first bore and the second metal strength member is disposed within the second bore.

13. A fiber optic cable sub-assembly comprising:
a fiber optic cable including at least one optical fiber, a cable jacket that houses the optical fiber and at least one metal strength member;
a collar attached to an end portion of the at least one metal strength member by a crimped connection, wherein the optical fiber extends beyond an outer axial end of the collar; and
a connector housing attached to the collar, wherein the housing provides a backstop for the collar to transfer tensile forces from the strength member to the connector housing; and
an interface operably connecting the optical fiber to an active optical component within the connector housing, wherein the interface comprises a total internal reflection block operably attached to the optical fiber.

14. The fiber optic cable sub-assembly of claim 13, the collar further comprising a passage, wherein the optical fiber passes through the passage.

15. The fiber optic cable sub-assembly of claim 14, wherein the passage is defined by a structure extends at least partially about the optical fiber.

16. The fiber optic cable sub-assembly of claim 13, wherein the collar is attached to the end portion of the at least one metal strength member by a connection selected from the group consisting of a swaged connection, a crimped connection, a clamped connection, set-screw connection, an adhesive connection, a welded connection, and a multi-piece collar connection.

17. A fiber optic cable sub-assembly comprising:
a fiber optic cable including at least one optical fiber, a cable jacket that houses the optical fiber and at least one metal strength member;
a collar attached to an end portion of the at least one metal strength member, wherein the optical fiber extends beyond an outer axial end of the collar;
a connector housing attached to the collar, wherein the connector housing provides a backstop for the collar to transfer tensile forces from the strength member to the connector housing; and
an interface operably connecting the optical fiber to an active optical component within the connector housing, wherein the interface comprises a total internal reflection block operably attached to the optical fiber.

18. A fiber optic cable sub-assembly comprising:
a fiber optic cable including at least one optical fiber, a cable jacket that houses the optical fiber and at least one metal strength member;
a collar attached to an end portion of the metal strength member by a crimped connection, the collar comprising a first half and a second half connected to the second half, wherein:
the first half and the second half of the collar define an inner passage,
the at least one optical fiber is disposed within the inner passage and extends beyond an outer axial end of the collar, and
the at least one metal strength member is secured between the first half and the second half of the collar; and
a connector housing attached to the collar, wherein:
the connector housing comprises a first rear portion engaging an end portion of the fiber optic cable;
the collar comprises at least one axial groove extending between the outer axial end of the collar and an inner axial end of the collar;
a first neck of the first rear portion of the housing extends through the axial groove; and
the connector housing provides a backstop for the collar to transfer tensile forces from the at least one metal strength member to the connector housing.

19. The fiber optic cable sub-assembly of claim 18, further comprising an interface operably connecting the optical fiber to an active optical component within the connector housing.

20. The fiber optic cable sub-assembly of claim 19, wherein the interface comprises a total internal reflection block operably attached to the optical fiber.

* * * * *